United States Patent [19]
Fujikawa et al.

[11] Patent Number: 5,798,126
[45] Date of Patent: Aug. 25, 1998

[54] SEALING DEVICE FOR HIGH PRESSURE VESSEL

[75] Inventors: Takao Fujikawa; Noriaki Nakai, both of Takasago, Japan

[73] Assignee: Kabushiki Kaisha Kobe Seiko Sho, Kobe, Japan

[21] Appl. No.: 861,392

[22] Filed: May 21, 1997

[30]  Foreign Application Priority Data

May 21, 1996 [JP] Japan ................ 8-125921

[51] Int. Cl.⁶ .............................. B29C 43/10
[52] U.S. Cl. ............. 425/78; 425/405.2; 425/DIG. 26; 425/DIG. 47
[58] Field of Search ............. 425/78, 405.1, 425/405.2, DIG. 26, DIG. 47

[56]  References Cited

U.S. PATENT DOCUMENTS

| | | | |
|---|---|---|---|
| 3,091,804 | 6/1963 | Gerard et al. | 425/405.2 |
| 3,224,042 | 12/1965 | Meissner | 425/405.2 |
| 3,933,418 | 1/1976 | Elmgren | 425/405.2 |
| 4,471,949 | 9/1984 | Ishii | 425/405.2 |
| 4,756,680 | 7/1988 | Ishii | 425/405.2 |
| 5,057,171 | 10/1991 | Horner et al. | 425/405.2 |

*Primary Examiner*—Patrick Ryan
*Assistant Examiner*—Joseph Leyson
*Attorney, Agent, or Firm*—Oblon, Spivak, McClelland, Maier & Neustadt, P.C.

[57] ABSTRACT

A sealing device for preventing leakage of pressure in pressure-processing a workpiece to be processed under isostatic pressure in a high pressure vessel, includes a ring member fitted to the opening/closing end of the vessel. When a cover is closed, an axial seal ring and a plane seal ring are mounted, with the plane seal ring adhered to the cover.

6 Claims, 6 Drawing Sheets

SEALING DEVICE FOR HIGH PRESSURE VESSEL

BACKGROUND OF THE INVENTION

1. Field of the Invention

The present invention relates to a sealing device for a high pressure vessel which facilitates opening and closing of the high pressure vessel in order to facilitate insertion and removal of a solid workpiece to be processed, and which has the excellent sealing function in pressurization. Particularly, the present invention relates to a sealing device which can ensure both ease of opening and closing of a high pressure vessel and sealing performance in an isostatic pressing apparatus using a gas as a pressure medium under pressure within a wide range of vacuum to high pressure.

2. Description of the Related Art

Recently, applications of a high pressure process used for industrial purposes have been increasingly diversified, and the pressure range used has been increasingly widened. Particularly, in manufacture of electronic materials such as a semiconductor, and electronic devices, pressures of several hundreds to thousand $kgf/cm^2$ have begun to be studied. For example, hot isostatic pressing with an inert gas of several hundreds to 2000 $kgf/cm^2$ is used for removing pores in a soft ferrite sintered material for magnetic heads and in a PLZT sintered material for optoelectronics and for improving adhesion between respective layers in a laminated device comprising metal layers and glass ceramic layers which are laminated. A high pressure oxidation process using high pressure oxygen is used as a method of forming a $SiO_2$ oxide film on the surface of a silicon wafer. In recent years, a pressure fill method has been used for crushing pores formed below an Al alloy interconnecting film formed on a silicon wafer.

In these fields, since contamination with the impurities contained in a high pressure hydraulic gas significantly affects the characteristics and commercial value of the product, it is necessary to decrease air contamination as much as possible. Therefore, evacuation is carried out before high pressure processing in order to prevent a workpiece to be processed from contacting air components, particularly, during heating.

The apparatus used is thus required to have sealing performance within a wide pressure range of a high vacuum of $10^{-3}$ Torr or less to a high pressure of 1000 $kgf/cm^2$. On the other hand, such products are in keen competition for cost, and the apparatus is also required to have high productivity. It is thus necessary to decrease the time required for handling the workpiece or the like. A problem with respect to handling of the workpiece to be processed is a problem with the time required for opening and closing the apparatus. Even in a high pressure apparatus, a sealing mechanism which permits reduction in the opening and closing time and facilitates maintenance increasingly becomes indispensable.

Figure 9:
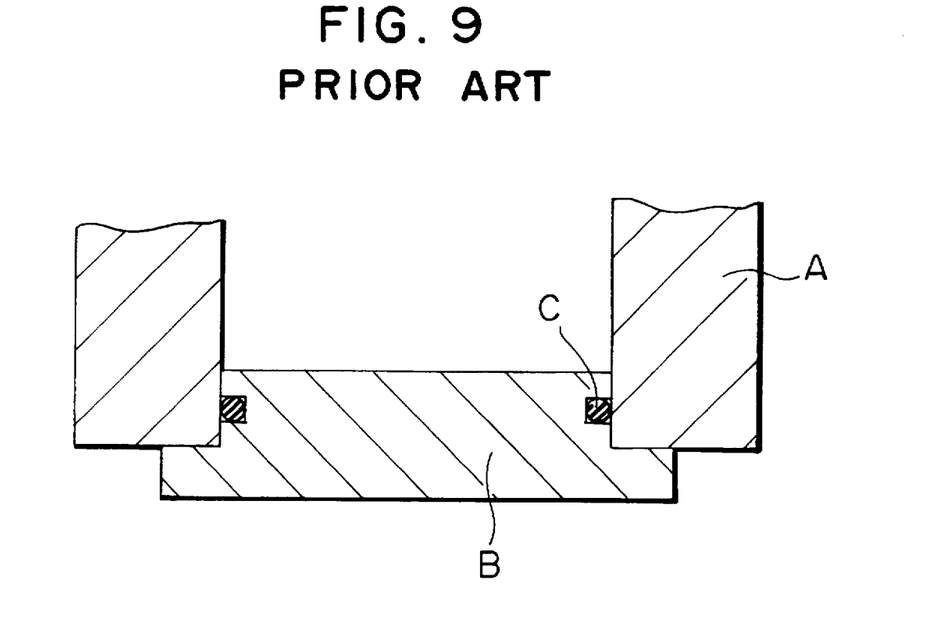
FIG. 9 is a sectional view of a first conventional example.
Figure 10:
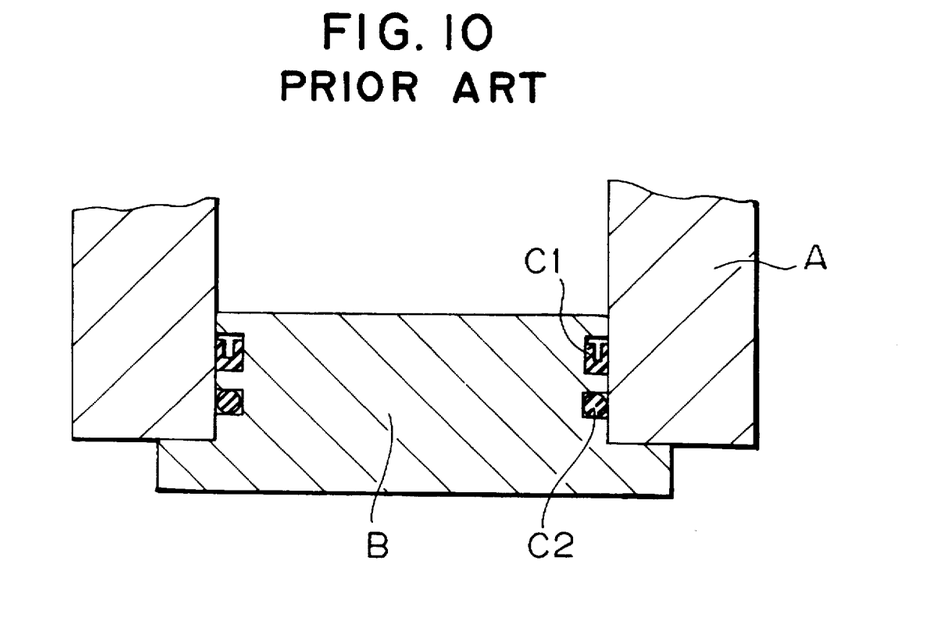
FIG. 10 is a sectional view of a second conventional example.

FIG. 9 shows a most typical structure for sealing a high pressure cylindrical body and a cover of a high pressure vessel. In the structure shown in FIG. 9, a groove is formed in the engaged portion of high pressure vessel cover B having a projection which is engaged with the end of high pressure cylinder A, and an O-ring or a disk-formed packing and an axial seal ring C comprising a U-ring are inserted into the groove, to cause axial sealing by the inner surface of the high pressure cylinder. When the cover is repeatedly opened and closed under a high pressure of 1000 $kgf/cm^2$ or more, the U ring is frequently used. On the other hand, the U-ring is effective for sealing a hydraulic medium at high pressure, but exhibits poor sealing performance when the inside is used under a vacuum. In such a case, both U-ring C1 for sealing high-pressure gas and O-ring C2 for vacuum sealing are often used, as shown in FIG. 10.

Another structure for a large HIP apparatus is also proposed in which a circular ring is movably inserted between a high pressure cylinder (vessel) and a lower plug (cover) as a lower cover of the cylinder to improve the sealing effect (refer to Japanese Patent Publication No. 57-25747).

Figure 11:
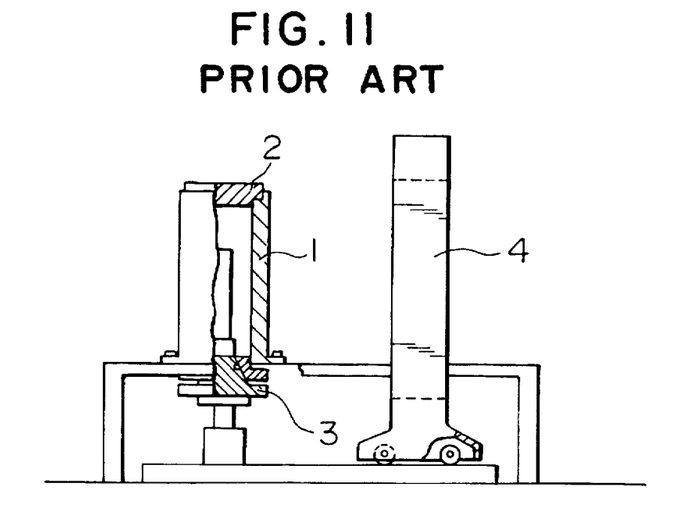
FIG. 11 is a drawing illustrating the entire construction of a third conventional example.
Figure 12:
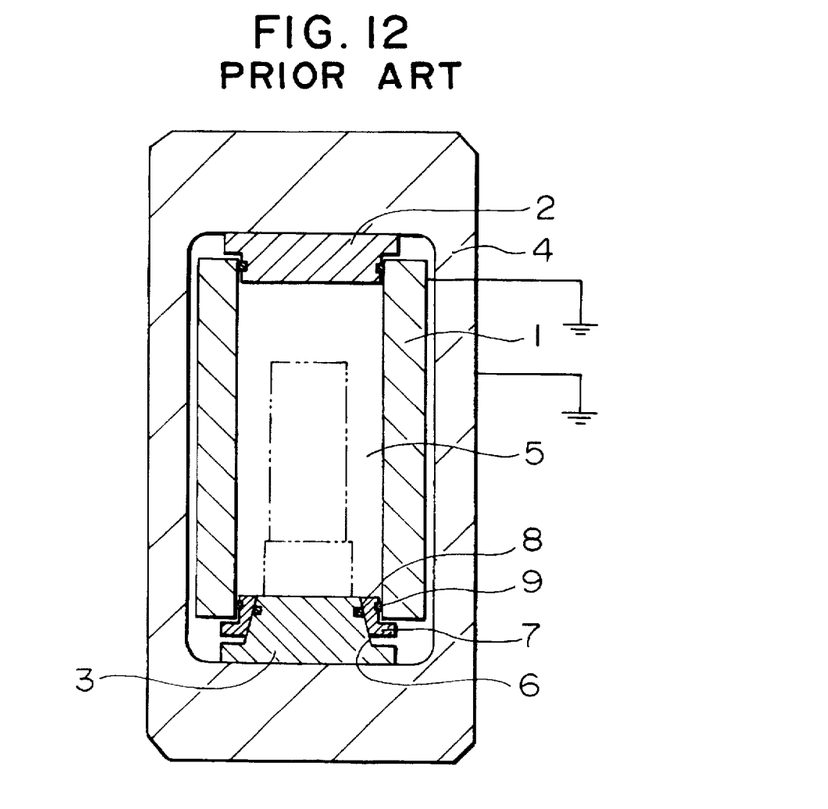
FIG. 12 is a front view of the third conventional example.

Referring to FIG. 11, a structure comprises a high-pressure cylinder 1, an upper plug 2, a lower plug 3 and a press frame 4. In this structure of prior art, as shown in FIG. 12, the lower plug 3 is formed in a taper in which the sectional area gradually decreases toward a high-pressure chamber 5, and an annular ring 7 having a taper face corresponding to the taper face 6 of the lower plug 3 is interposed between the lower plug 3 and the lower opening of the high pressure cylinder 1. A seal ring 8 is inserted between these taper faces, and a seal ring 9 is inserted between the fitting faces of the high-pressure cylinder 1 and the annular ring 7. The axial sealing shown in FIG. 9 has a problem in that particularly when the diameter of the high pressure cylinder is increased, the diameter of the high pressure cylinder is increased due to the inner pressure, and a seal ring is pushed into the increased gap in the seal ring portion and damaged, thereby deteriorating the sealing function. In the prior art shown in FIG. 12, as a measure against the problem, a seal structure comprising the taper faces is combined so that the annular ring follows an increase in the diameter of the high pressure cylinder and prevents an increase in the gap.

The above-mentioned seal structures (sealing device) for the cover of the high pressure vessel have the following problems:

1) In both structures shown in FIGS. 9 to 12, the cover (plug) is projected into the high pressure cylinder in order to ensure the sealing performance at the cylindrical surface, and the cover is opened by removing the cover in the axial direction. Therefore, when the cover is opened and closed, the cover must be drawn at least for a length corresponding to the length of the portion projecting into the high pressure cylinder. Such a cover can be used for a processing apparatus for a workpiece having a total length of 10 cm to 1 m or more, but the cover cannot be used for a product having a length (thickness) of several centimeters or less or several millimeters.

2) Since both structures are seal structures for preferentially sealing a hydraulic medium under pressure of as high as several hundreds to several thousands $kgf/cm^2$, axial sealing is achieved. However, the axial sealing cannot avoid sliding wear of the seal ring at the time of opening and closing the cover, and thus the life of the vacuum sealing function is short.

SUMMARY OF THE INVENTION

Accordingly, an object of the present invention is to provide a sealing device for a high pressure vessel which can solve the above problems of the conventional devices.

In order to achieve the object, in accordance with an embodiment of the present invention, there is provided a sealing device for a high pressure vessel for preventing leakage of pressure in pressure-processing a workpiece to be processed under isostatic pressure in the high pressure vessel, the high pressure vessel having a circular sectional form and comprising at least two members. The sealing device comprises a cylindrical portion formed at least at the end of one of the members which constitute the high-pressure vessel, a ring member fitted into the cylindrical portion, an axial seal ring mounted to the fitting faces, and a plane seal ring mounted to the open end side of the ring member so as to adhere to the end surface of the other member which constitutes the high pressure vessel.

In accordance with the present invention, the sealing device preferably further comprises a frame for holding a load due to the inner pressure of the high pressure vessel in the axial direction thereof, wherein the ring member is fitted so as to be slidable for a distance equal to or more the extension of the frame due to the load. The sealing device preferably further comprises press means for pressing the ring member in order to initially sealing the plane seal ring.

In accordance with the present invention, both the plane seal ring and the axial seal ring are preferably contained in grooves formed in the ring member, and at least one of the plane seal ring and the axial seal ring is preferably contained in a groove formed in one of the members which constitute the high pressure vessel. Further, at least the axial seal ring of the plane seal ring and the axil seal ring is pluralized, and at least one of the plurality of axial seal rings is preferably an O-ring.

As described above, as workpieces to be processed under high pressure have recently been shifted to electronic materials and devices, the workpieces have increasingly had a plate shape. In this field, since processing in a high vacuum is frequently carried out as pre-processing in order to control the atmosphere, in order to avoid air contamination during high pressure processing, it is important to completely evacuate the inside of the apparatus before processing. It is also important to decrease cost, and high pressure processing in a short cycle is highly demanded.

The present invention provides a sealing device which permits the cover to be simply opened and closed, i.e., to be opened and closed within a short time, when a workpiece to be processed is inserted or removed, and which has excellent sealing performance within a pressure range of high pressure to high vacuum. The sealing device is effective to comply with the above requirements, and will significantly contribute to development in high pressure processing in this field in future.

DESCRIPTION OF THE PREFERRED EMBODIMENT

Embodiments and the operation of the present invention will be described below with reference to the drawings.

Figure 1:
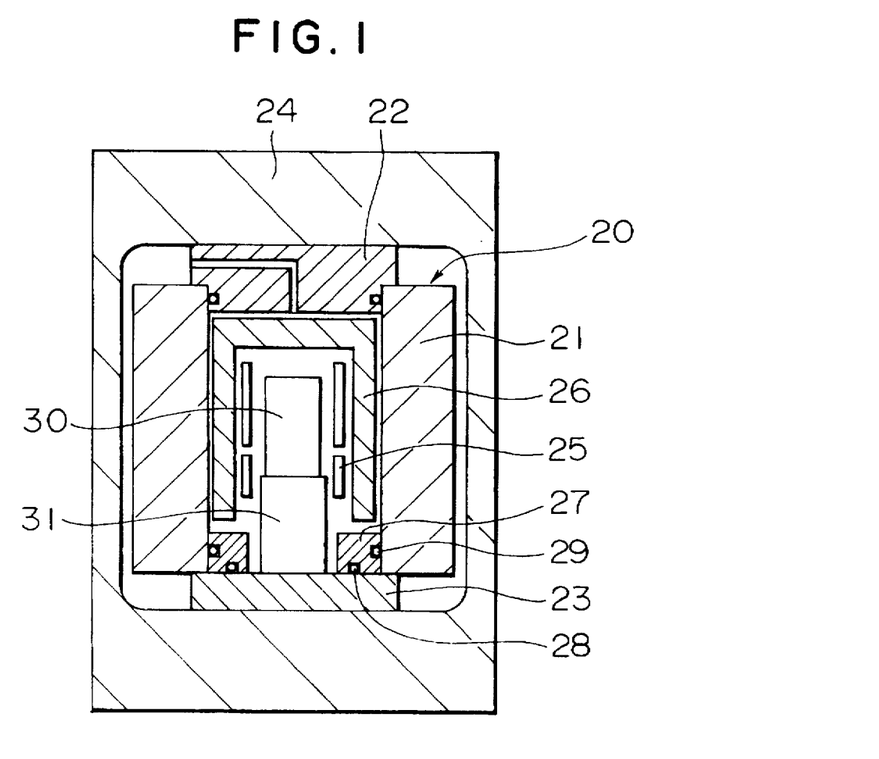
FIG. 1 is a drawing illustrating the construction of an HIP apparatus according to the present invention.

FIG. 1 shows a typical embodiment of the present invention wherein the present invention is applied to a hot isostatic pressing apparatus (HIP apparatus). A high pressure vessel 20 comprises a high pressure cylinder 21, an upper cover for closing the upper opening of the high pressure vessel 21, a lower cover 23 for closing the lower opening, a window-frame-like frame 24 for supporting an axial load generated by the gas pressure in the high-pressure vessel, and an electric furnace provided in the high pressure vessel 20 and comprising a heater 25 and a heat insulating layer 26.

The lower cover 23 is arranged to contact the lower end surface of the high pressure cylinder 21, and sealing is realized by a plane seal ring 28 and an axial seal ring 29 which are provided in a ring member 27 provided to contact the upper surface of the lower cover and engage with the inner surface of the lower portion of the high-pressure cylinder.

Namely, in this embodiment of the present invention, in pressure processing a workpiece 30 to be processed under isostatic pressure in the high pressure vessel 20 having a circular sectional form and comprising at least two members, the sealing device for preventing leakage of pressure comprises a cylindrical portion formed at least at the end of one of the members which constitute the high pressure vessel 20, i.e., the high pressure cylinder 21, the ring member 27 fitted into the cylindrical portion, the axial seal ring 29 mounted to the fitting faces between the cylindrical portion and the ring member 27, the plane seal ring 28 mounted to the open end side of the ring member 27 so as to adhere to the end surface of the other member, i.e., the lower cover 23, which constitutes the high pressure vessel 20.

In the above construction, when the workpiece 30 placed on a hearth 31 is pressure-processed with a hydraulic medium gas such as argon or the like under isostatic pressure in the high pressure vessel 20, an increase in the pressure in the high pressure vessel 20 causes an increase in the axial load acting on the upper and lower covers 22 and 23, resulting in vertical extension of the window frame-like frame 24. If the high pressure cylinder 21 is fixed, therefore, the upper cover 22 and the lower cover 23 tend to move upward and downward, respectively, for a length corresponding to the extension of the window frame-like frame 24.

If a portion of the upper cover 22 which projects into the high pressure cylinder 21 has a sufficient length, the seal function is maintained. However, in the portion of the lower cover 23 of the apparatus shown in FIG. 1, the ring member 27 is vertically moved downward to maintain the seal function. Namely, if the pressure in the high pressure vessel 20 is P kgf/cm² higher than the external pressure, to a load corresponding a difference between the pressure-receiving areas of the axial seal ring 29 having a diameter Ds and the plane seal ring 28 having a diameter Df, i.e., a load of P×(Ds²−Df²)/4, always acts downward on the ring member 27. This causes the function to adhere the plane seal face to the lower cover 23, and thus a stable sealing function can be realized.

A large HIP apparatus is generally operated once a day, and the lower cover is opened each time the workpiece is inserted or removed. Although, in the conventional axial sealing structures shown in FIGS. 9 to 12, the life of the seal ring due to sliding is a level of several tens, the application of the present invention permits the workpiece to be inserted or removed by opening and closing the plane seal portion, and can thus significantly decrease abrasion damage due to sliding, thereby improving the life of the seal ring ten times or more.

In the present invention, the frame 24 is provided for supporting the axial load due to the pressure in the high pressure vessel 20, and the ring member 27 is mounted so as to be slidable for a distance equal, to or more the extension of the frame 24 caused by the load. The frame 24 may be any one of a laminated plate type, a wound type, etc. Although a window frame type is preferred, a C-shaped frame may be used.

The frame 24 is detachable from the upper and lower covers 22 and 23 so that the workpiece 30 to be processed can be inserted and removed, and the frame 24 is thus a truck type or turning type for the detaching operation.

Figure 2:
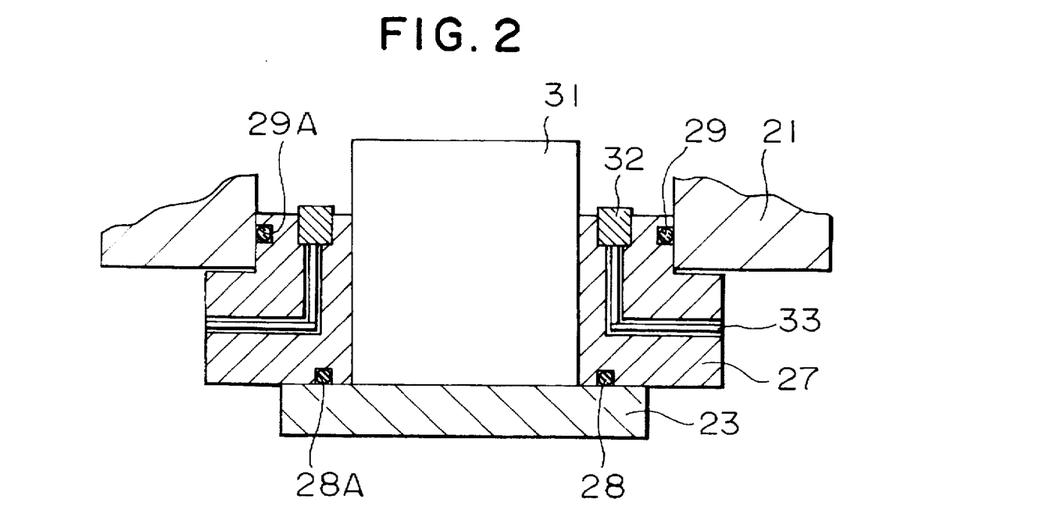
FIG. 2 is a sectional view illustrating a principal portion of the HIP apparatus according to the present invention.

FIG. 2 shows another embodiment in which the present invention is applied to an HIP apparatus. In FIG. 2, a lead wire 33 having an electrode 32 for supplying a current to the heater is incorporated into the ring member 27 together with an insulating seal structure. In this embodiment, the heater and the heat insulating layer provided in the high pressure vessel 20 may be fixed on the ring member 27. The ring member 27 need not be entirely fitted into the high pressure cylinder 21, as in this embodiment. Even if the ring member 27 comprises a flange which is exposed to the outside between the cover 23 and the cylinder 21, the same function can be attained.

Figure 3:
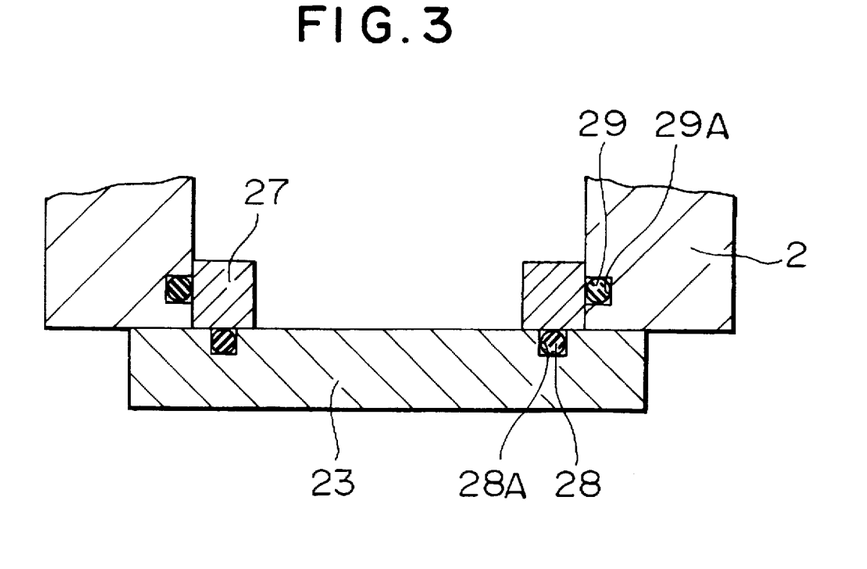
FIG. 3 is a sectional view illustrating a first modified example of the seal structure of the present invention.
Figure 4:
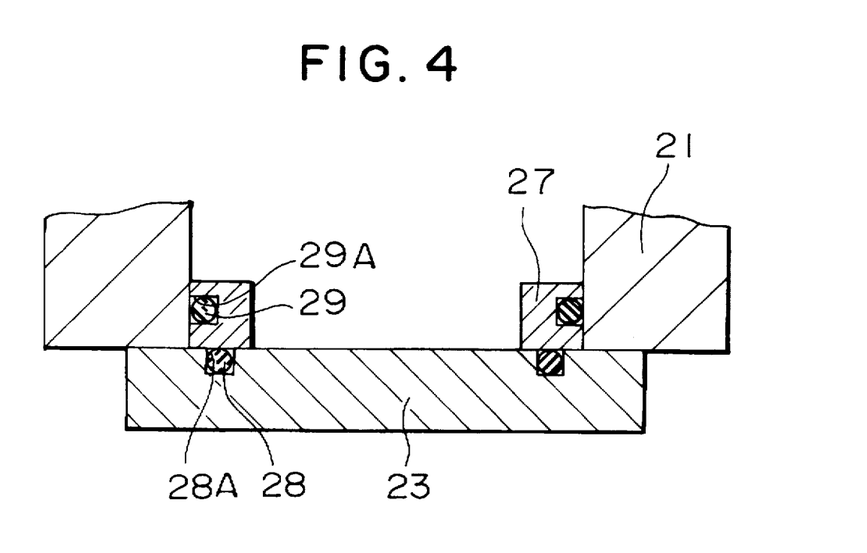
FIG. 4 is a sectional view illustrating a second modified example of the seal structure of the present invention.

FIGS. 3 and 4 shows modified examples of the arrangement of the ring member 27 and the seal rings 28 and 29. Whether the seal rings 28 and 29 are provided on the ring member side or contained in grooves 28A and 29A formed in the inner surface of the high pressure cylinder or the cover on the opposite side, the same function is exhibited. The arrangement may be selected according to ease of the work of changing the seal rings.

Figure 5:
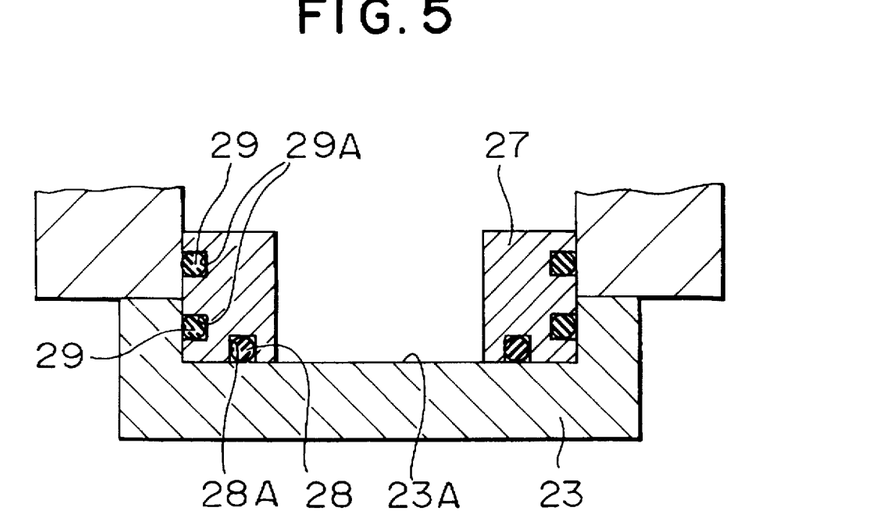
FIG. 5 is a sectional view illustrating a third modified example of the seal structure of the present invention.

The ring member 27 may be fitted over the lower portion of the cylinder 21 and the recess 23A formed in the lower cover 23, as shown in FIG. 5.

Figure 6:
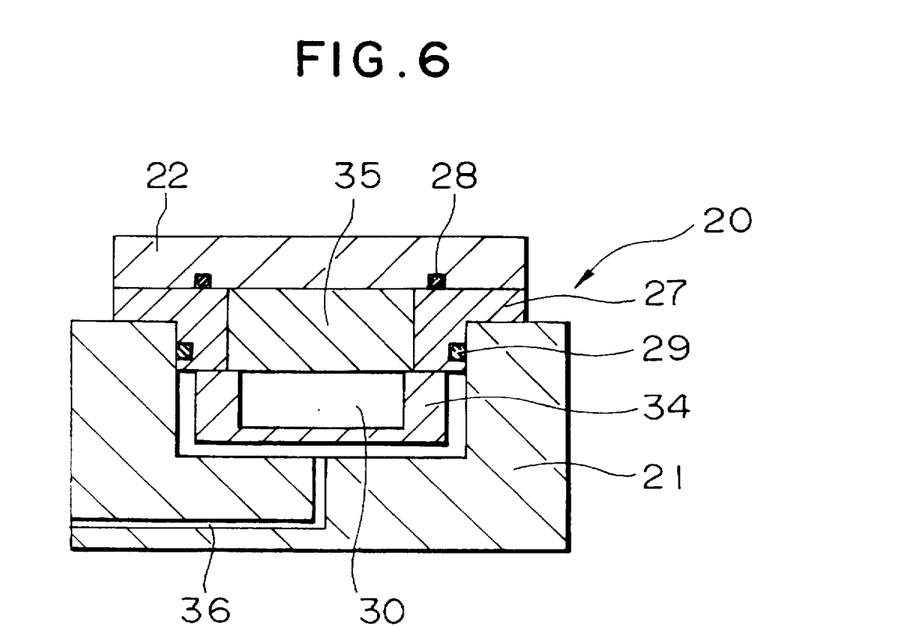
FIG. 6 is a drawing illustrating the construction of a CIP apparatus according to the present invention.

FIG. 6 shows a further embodiment in which the present invention is applied to a dry type cold isostatic pressing apparatus (CIP apparatus). In FIG. 6, the high-pressure vessel 20 comprises a bottomed high pressure cylinder 21, a ring member 27 having a flange and fitted into the high pressure cylinder 21, and an axial seal ring 29 mounted to the interface between the high pressure cylinder 21 and the ring member 27. A workpiece powder 30 to be processed is surrounded by a rubber mold 34 and a soft rubber cover 35, and a plane seal ring 28 is mounted to the interface between the ring member 27 and an upper cover 22 placed over the soft rubber cover 35 and the ring member 27. The workpiece 30 is pressure-processed under isostatic pressure through the rubber mold 34 by enforcing a hydraulic medium such as water into a processing chamber through a hydraulic medium passage hole 36.

Particularly, when a short or plate-shaped molding is formed, as described above, the high pressure vessel becomes short, and thus it is recommended to design an apparatus in which the length of the cover is decreased, and the whole size is made compact. In the structure shown in FIG. 6, the soft rubber upper cover 35 is opened to fill a raw material powder for molding in the rubber mold 34, and then closed, and the upper cover 22 is placed on the soft rubber cover 35. Since the plane seal ring 28 is mounted to the upper cover 22, the powder spilled on the ring member in filling can easily be removed, thereby preventing sealing error and wear of the plane seal ring 28 due to the spilled powder. In the embodiment shown in FIG. 6, the plane seal portion is adapted for sealing the soft rubber cover material to prevent it from projecting due to the inner pressure, not sealing the hydraulic medium, the sealing function is basically the same as described above.

The CIP apparatus shown in FIG. 6 also comprises the frame 24.

Figure 7:
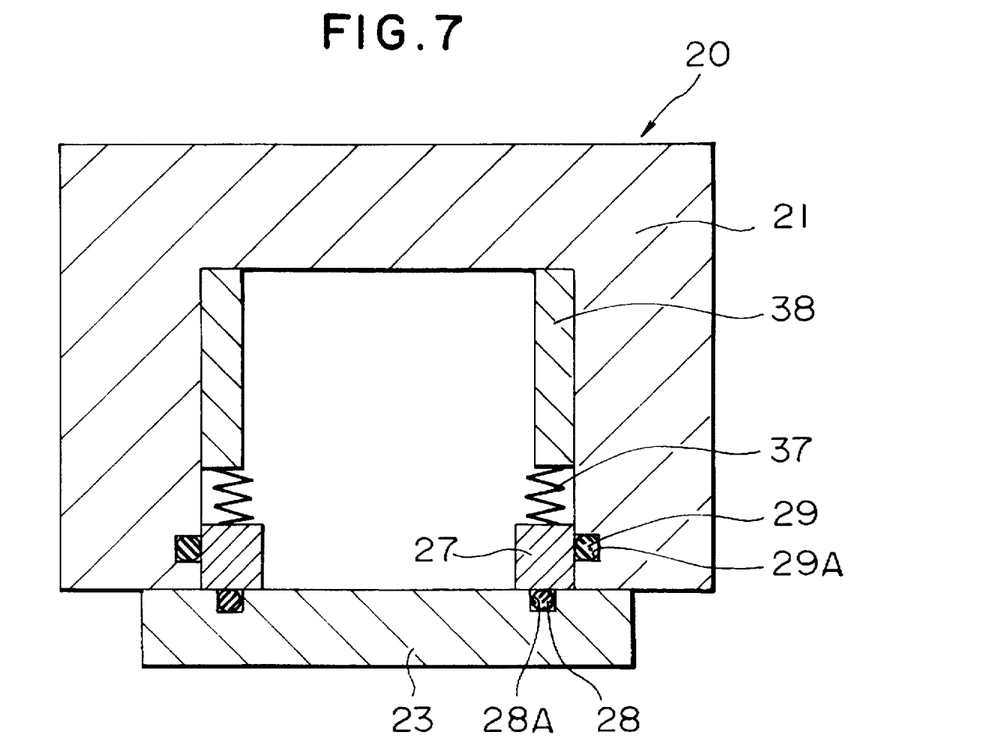
FIG. 7 is a sectional view illustrating a preferred modified embodiment of the present invention which further comprises press means.

FIG. 7 shows an embodiment in which in order to ensure the function of a plane seal, a press member 37 is provided for applying an initial pressure to adhere a plane seal ring 28 to the seal face of a cover member 23 after the lower cover 23 is closed. In this embodiment, when the high pressure cover 23 is adhered to a high pressure cylinder 21, the ring member 27 is pressed on the cover by a pressing spring 37 held by a support ring 38. The weight of the ring member 27 or the weight of a structure such as the heat insulating layer 26 provided in the high pressure vessel shown in FIG. 1 may be used for press means in place of the spring, and a coil spring or a disc spring may be used as the press spring.

Figure 8:
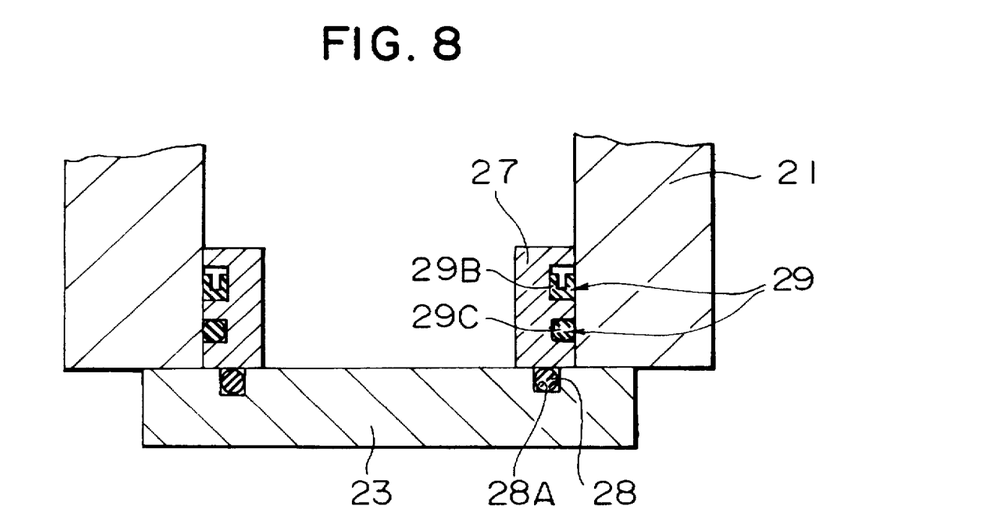
FIG. 8 is a sectional view illustrating a preferred embodiment of the present invention wherein an axial seal ring is doubled (plural)

FIG. 8 shows an embodiment in which the axial seal ring 29 has a double structure comprising a U-ring 29B and an O-ring 29C. In this structure, the function of the U-ring having excellent high pressure seal performance and durability is employed for use under high pressure, and the airtightness of the O-ring is employed for operation under a vacuum. In this embodiment, the high pressure seal ring is provided at an inner position so as to prevent application of high pressure to the O-ring, as shown in FIG. 8. Even when the plane seal member 28 is doubled, the U-ring is provided at an inner position. In the structure shown in FIG. 8, the O-ring for vacuum sealing may be provided between the high pressure vessel cover and the lower end surface of the high-pressure cylinder.

In the above embodiments, the seal ring grooves 28A and 29A may be V-shaped grooves, round grooves or under cut grooves other than the square grooves shown in the drawings, and the seal rings 28 and 29 may be the O-rings or U-rings shown in the drawings, to each of which a backup ring is attached, square rings, X-rings, V-rings, T-rings, rings with cap seals or these rings to each of which a backup ring is attached.

As described above, in the present invention, when a workpiece to be processed is inserted or removed, a constituent member having the plane seal ring, i.e., a cover member, may be opened and closed, and the axial seal ring need not be slid, thereby permitting opening and closing within a short time, and exhibiting excellent seal performance within a pressure range of high pressure to high vacuum.

What is claimed is:

1. A sealing device for a high pressure vessel for preventing leakage of pressure in pressure-processing a workpiece to be processed under isostatic pressure in the high pressure vessel, the high pressure vessel having a circular sectional form and comprising at least two members, an end of one of which has a cylindrical portion and the other of which comprises a cover which is openable to exchange a workpiece to be processed, the device comprising:

a ring member fitted into the cylindrical portion;

an axial seal ring mounted to an interface between the ring member and the cylindrical portion; and a plane seal ring mounted on an open end side of the ring member so as to adhere to an end surface of the other member.

2. A sealing device for a high pressure vessel according to claim 1, further comprising a frame for supporting an axial load due to the pressure in the high pressure vessel, wherein the ring member is fitted so as to be slidable for a distance equal to or more than the extension of the frame caused by the load.

3. A sealing device for a high pressure vessel according to claim 1, further comprising press means for pressing the ring member for initially sealing the plane seal ring.

4. A sealing device for a high pressure vessel according to any one of claims 1 to 3, wherein both the plane seal ring and the axial seal ring are contained in grooves formed in the ring member.

5. A sealing device for a high pressure vessel according to any one of claims 1 to 3, wherein at least one of the plane seal ring and the axial seal ring is contained in a groove formed in one of the constituent members of the high pressure vessel.

6. A sealing device for a high pressure vessel according to any one of claims 1 to 3, wherein at least the axial seal ring is pluralized, and at least one of said axial seal rings is an O-ring.

* * * * *

UNITED STATES PATENT AND TRADEMARK OFFICE
CERTIFICATE OF CORRECTION

PATENT NO. : 5,798,126
DATED : August 25, 1998
INVENTOR(S) : Takao FUJIKAWA, et al.

It is certified that error appears in the above-identified patent and that said Letters Patent is hereby corrected as shown below:

On the title page, Item [75], the second inventor's first name, is misspelled. It should be:

--Noriyki Nakai--

Signed and Sealed this

Sixteenth Day of February, 1999

Attest:

*Acting Commissioner of Patents and Trademarks*

Attesting Officer